United States Patent [19]

Merrell

[11] 3,869,143
[45] Mar. 4, 1975

[54] INFLATOR FOR OCCUPANT RESTRAINT CUSHION

[75] Inventor: Richard L. Merrell, Huron, Ohio

[73] Assignee: General Motors Corporation, Detroit, Mich.

[22] Filed: June 25, 1973

[21] Appl. No.: 373,388

[52] U.S. Cl. ........ 280/150 AB, 340/242, 200/83 N, 73/420
[51] Int. Cl. ........................................... B60r 21/08
[58] Field of Search ............. 280/150 AB; 222/3, 5; 137/68; 220/89 A; 73/420, 407, 393

[56] References Cited
UNITED STATES PATENTS

| | | | |
|---|---|---|---|
| 3,663,036 | 5/1972 | Johnson | 280/150 AB |
| 3,723,684 | 3/1973 | Greenwood | 200/83 N |
| 3,735,376 | 5/1973 | Kermer et al. | 340/242 |
| 3,761,655 | 9/1973 | Whelan et al. | 280/150 AB |
| 3,773,353 | 11/1973 | Trowbridge et al. | 280/150 AB |
| 3,774,150 | 11/1973 | Matsui et al. | 280/150 AB |
| 3,788,667 | 1/1974 | Vancil | 280/150 AB |
| 3,809,835 | 5/1973 | Watt | 200/83 N |

Primary Examiner—Kenneth H. Betts
Attorney, Agent, or Firm—Herbert Furman

[57] ABSTRACT

An inflator of the augmented type includes a pressure vessel and a combustion chamber containing a gas generating charge of propellant and opening to the combustion chamber. A pressure deflectable annulus is sealed to the combustion chamber around the opening and also sealed to a low pressure sensor which seats to the combustion chamber around the opening to limit deflection of the annulus. An impact member is mounted on the low pressure sensor and impacts a severable plug of the pressure vessel to open this plug and communicate the pressure vessel with an occupant restraint cushion when the charge of propellant is initiated and the resultant high pressure, high temperature gases blow the pressure sensor from the opening and rupture the annulus.

9 Claims, 3 Drawing Figures

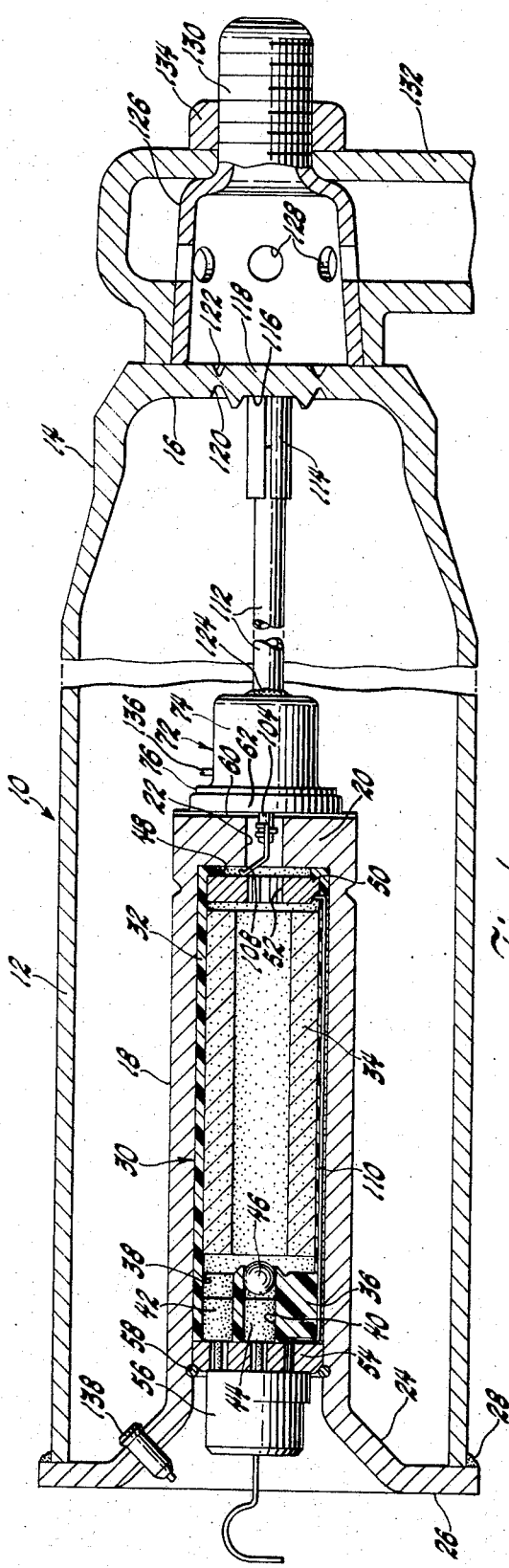

INFLATOR FOR OCCUPANT RESTRAINT CUSHION

This invention relates generally to inflators of the augmented type and more particularly to such inflators having a combustion chamber separate from the pressure vessel and communicating with the vessel across an outlet closed by a rupturable seal.

Inflators of the augmented type are well known. The rupturable seal is usually provided by a rupturable diaphragm formed integrally with the combustion chamber or formed separately and secured to the chamber. It is also known to mount an impact member to the rupturable seal of the combustion chamber for impacting and removing a severable outlet plug of the pressure vessel to communicate the vessel with an occupant restraint cushion. It is also known to provide the pressure vessel with a low pressure sensor to give a signal when the pressure of the gas within the pressure vessel has dropped below a set level.

While the inflator of this invention is of the augmented type, the rupturable seal for the combustion chamber outlet and the low pressure sensor are combined to obtain both functions from one structure and yet permit normal opening of both the combustion chamber and pressure vessel outlets.

In the preferred embodiment, a low pressure sensor is sealed to a pressure responsive or deflectable annulus which is sealed to the combustion chamber around the outlet thereof. Since the pressure within the pressure vessel is above that within the combustion chamber, the annulus deflects. The engagement of the sensor with the combustion chamber limits the deflection of the annulus. Since the pressure sensor and annulus close the outlet, the use of a diaphragm for this purpose is obviated. Additionally, the annulus need not be of the strength that would be normally required since the annulus is backed up by the pressure sensor engaging the combustion chamber. The pressure sensor is connected through the combustion chamber with an internal indicator circuit. Thus, no openings through the walls of the pressure vessel are necessary. An impact member is mounted to the pressure sensor and impacts a severable plug of the pressure vessel to remove this plug and open the pressure vessel outlet when the pressure sensor and the annulus are blown from the combustion chamber outlet upon initiation of the charge of propellant in the combustion chamber and the generated gases reaching a predetermined level.

One of the features of this invention is that it provides an improved inflator of the augmented type wherein a pressure sensor for the pressure vessel overlies the combustion chamber outlet and is sealed thereto to close the outlet to the pressure vessel until such time as the charge of propellant within the combustion chamber is initiated and high pressure, high temperature gases are generated. Another feature of this invention is that the pressure sensor also functions to open the outlet from the pressure vessel to an inflatable occupant restraint cushion when the gases are generated. A further feature of this invention is that the pressure sensor is movably mounted to the combustion chamber over the outlet thereof by pressure deflectable sealing means and engages the combustion chamber when the sealing means deflects under the pressure of the gas within the pressure vessel. Yet another feature of this invention is that the pressure sensor is blown away from the outlet of the combustion chamber by the generated gases. Yet a further feature of this invention is that the pressure sensor is electrically connected to an indicator circuit external of the inflator through the combustion chamber rather than through any openings in the walls of the pressure vessel.

These and other features of the invention will be readily apparent from the following specification and drawings wherein:

FIG. 1 is a sectional view of an inflator according to this invention;

FIG. 2 is a sectional view taken generally along line 2—2 of FIG. 3; and

FIG. 3 is an enlarged view of a portion of FIG. 1.

Referring now particularly to FIG. 1 of the drawings, an inflator 10 according to this invention includes a cylindrical pressure vessel 12 which tapers to a smaller diameter at its one end 14 and includes an integral wall 16 closing this one end. A cylindrical combustion chamber 18 fits within the pressure vessel and includes a wall 20 closing the inner end thereof and provided with a cylindrical outlet 22 coaxial with the combustion chamber. The other end of the combustion chamber includes an outwardly flaring or conical wall 24 which terminates in a radial flange 26. Flange 26 seats against the other open end of the pressure vessel and is welded thereto at 28 in a conventional manner in order to close the pressure vessel. The pressure vessel is filled with any suitable gas under pressure, such as argon at 2,400 psi.

The combustion chamber 18 includes a cartridge assembly 30 which is disclosed in detail and claimed in copending application Ser. No. 331,663, Charles N. Hay, filed Feb. 12, 1973, assigned to the assignee of this invention. Generally, the cartridge assembly 30 includes a cylindrical plastic housing 32 which fits within the combustion chamber and contains a cylindrical charge 34 of propellant which generates high pressure, high temperature gases when the charge is initiated. Propellants such as this are known in the art and therefore no further description is necessary. The outer end wall 36 of the housing 32 is substantially thick and is provided with a pair of bores 38 and 40. Bore 38 contains an igniter or initiating element 42 and bore 40 likewise contains a squib 44. Retained within the bore 40 to the right of squib 44 is a conventional ball 46.

The inner end of the housing 32 includes a partial radial flange 48 which seats and retains a closure plate 50 having a central fluted orifice 52. The outlet 22, the orifice 52 and the ball 46 are coaxial. A seal plate 54 is secured to the wall 36 and mounts an electrical plug 56. The plug 56 is connected to the igniter 42 and squib 44 by electrical wires extending through the seal plate. The cartridge assembly is retained within the combustion chamber by a circular split ring 58 engaged in a semicircular groove in the combustion chamber wall and also engaged by the chamfered outer edge of the seal plate.

The plug 56 connects the igniter and squib with a known multi-level actuation system for a vehicle occupant restraint system. Such actuation systems can include a velocity responsive sensor and an inertia responsive sensor. Should the velocity responsive sensor or the inertia sensor sense low level impact conditions, the igniter 42 will be connected with the vehicle battery or other source of power to thereby initiate the charge 34 of propellant to generate high temperature, high pressure gases. Should the impact conditions sensed be of a higher level, then the squib 44 is connected to the same source of power to fire the ball 46 into the orifice 52. This restricts the orifice area and increases the pressure within the combustion chamber to increase the burn rate. The foregoing description is brief but reference may be had to the aforenoted copending applications for further details.

As shown in FIGS. 2 and 3, a deflectable annular seal or disc 60 is sealed to the wall 20 around the outlet 22 by welding or brazing. The disc 60 includes an integral axial wall 62 which in turn merges into an integral radial wall 64 defining an opening 66 coaxial with the outlet 22. A plate 68 is sealed to the flange 64 by welding and includes a central hollow boss 70 which is likewise coaxial with the outlet 22. The plate is part of a pressure sensor 72 which also includes a cylindrical housing 74 provided with a radial flange 76 which is welded to the wall 64 opposite the plate 68. The housing 74 further includes an integral end wall 78 which is provided with a central opening 80 and at least one coined groove 82 in the outer surface thereof extending to this opening.

A pressure responsive diaphragm or disc 84 includes a central circular flat 86 which is surrounded by a circular ribbed or corrugated portion 88 normally seating against the inner surface of wall 78. The corrugated portion is joined to a skirt 90 by a circular peripheral rib 92. A backing member 94 includes a skirt 96 and rib 98 which seat and secure the skirt 90 and rib 92 of the disc 84 to the housing 74. The member 94 includes a frustoconical wall 100 which includes a central opening 102 coaxial with the opening 80.

A switch contact 104 projects through the boss 70 and slightly through the opening 102 and is retained in place by being glass welded at 106 to the boss 70. This seals plate 68. A deflectable spring finger 108 is secured to the switch contact and projects through the outlet 22 and opening 66 into engagement with the orifice plate 50 which is formed of metal but is electrically insulated by the plastic housing 32. A wire 110, FIG. 1, projects through a groove in the housing 32 and out through openings in the wall 36 and the plate 54 to the plug 56. From the plug, this wire is connected to a suitable indicator circuit across a source of power.

It will be noted with reference to FIG. 1 that a hollow cylindrical rod 112 has one end received within a split sleeve 114 which fits within a central circular recess 116 of wall 16. The recess 116 is part of an integral severable or rupturable plug 118 which is formed in the wall 16 by oppositely disposed coined grooves 120 and 122.

The other end of the rod 112, as shown in FIGS. 2 and 3, is welded at 124 to the wall 78 around the opening 80, except that the weld does not close the groove 82.

A tapered outlet member 126 is secured to the wall 16 radially outwardly of the groove 122 and provided with a series of radial openings 128 and an integral threaded extension 130. A manifold 132 receives the outlet member and is secured thereto by a nut 134. Although not shown herein, the manifold communicates with a conventional diffuser of an occupant restraint system and this in turn communicates with an inflatable occupant restraint cushion.

The housing 72 and the plate 68 are assembled to the disc 60 before the disc is sealed to the wall 20 of the combustion chamber. The plate closes one end of the housing and the other end is closed by the pressure-responsive disc 84. After the housing is closed, it is filled with a suitable gas at a predetermined reference pressure, such as 2200 psi. The filling takes place through a filler tube 136 which is pinched off and sealed after the housing has been filled. When the housing 72 is filled, the disc 84 will be located as shown in FIG. 3. Thereafter the disc 60 is sealed to the combustion chamber wall 20 to close the outlet 22, FIG. 3. Plate 68 is slightly spaced from wall 20.

After the combustion chamber has been mounted to the pressure vessel to close this vessel, the pressure vessel is filled through a conventional fill valve 138 with a suitable gas, such as argon at 2,400 psi as previously mentioned. Since the pressure of the gas within the pressure vessel is greater than that within the housing 72, the disc 84 will be deflected to the left as viewed in FIG. 3 so that the corrugated portion 88 will now seat against the frustoconical wall 100 of the backing member 94 and the central flat 86 will close against the switch contact 104. This will ground the indicator circuit across the source of power. Also, since the gas within the pressure vessel is at a higher pressure than that within the combustion chamber 18, the sensor 72 will shift slightly to the left as viewed in FIG. 3 to seat the plate 68 against the wall 20 around the outlet 22. This slight movement of the sensor is permitted by deflection of the wall 64 of the disc 60 relative to the wall 62.

When the high pressure gases generated by initiation of the charge 34 of propellant reach a predetermined level, the disc 60 will rupture either at the juncture of the disc and wall 62 or the juncture of the walls 62 and 64. This will then blow or move the pressure sensor 72 and whatever portion of the disc 60 is attached thereto to the right to open the outlet 22 and permit these gases to flow into the pressure vessel. Simultaneously, the sensor 72 will shift the rod 112 to the right and the right end of the rod will move within the split sleeve 114 and impact plug 118 to sever this plug and permit the combined generated gases and pressure vessel gas to flow to the occupant restraint cushion and thereby inflate the cushion.

It will be noted from the foregoing description that although the disc 60 and plate 68 normally close the combustion chamber outlet 22, and the switch contact 104 is located within this outlet, the plate and the contact are easily and effectively removed to open the outlet when the generated gases within the combustion chamber reach a predetermined pressure level.

If at any time the pressure within the pressure vessel 12 drops below the reference pressure level, 2,200 psi, the disc 84 will move to its position shown in FIG. 3 to actuate the indicator circuit and indicate to the vehicle operator that the pressure within the pressure vessel has dropped below such minimum.

Thus, this invention provides an improved inflator.

I claim:

1. An inflator comprising, in combination, a pressure vessel containing pressure fluid and provided with a normally closed outlet controlling flow of the pressure fluid to an occupant restraint cushion, a combustion chamber within the pressure vessel and including an outlet open to the pressure vessel, a gas generating charge of propellant within the combustion chamber, pressure sensor means overlying the combustion chamber outlet for sensing the pressure level in the pressure vessel, means sealing the pressure sensor means to the combustion chamber to normally close the outlet thereof to the pressure vessel, means for initiating the charge of propellant to generate high pressure, high temperature gas and move the pressure sensor means from the outlet as the sealing means ruptures to thereby open the outlet from the combustion chamber to the pressure vessel, and means operative upon movement of the pressure sensor means for opening the pressure vessel outlet to the cushion.

2. An inflator comprising, in combination, a pressure vessel containing pressure fluid and provided with a normally closed outlet controlling flow of the pressure fluid to an occupant restraint cushion, a combustion chamber within the pressure vessel and including an outlet open to the presure vessel, a gas generating charge of propellant within the combustion chamber, pressure sensor means overlying the combustion chamber outlet for sensing the pressure level in the pressure vessel, pressure deflectable sealing means sealing the pressure sensor means to the combustion chamber to normally close the outlet thereof to the pressure vessel, means on the pressure sensor means engaging the combustion chamber upon deflection of the pressure deflectable sealing means under the pressure of the pressure fluid in the pressure vessel to limit such deflection, means for initiating the charge of propellant to generate high pressure high temperature gas and move the pressure sensor means from the outlet as the pressure deflectable sealing means ruptures to thereby open the outlet from the combustion chamber to the pressure vessel, and means operative upon rupture of the pressure deflectable sealing means for opening the pressure vessel outlet to the cushion.

3. An inflator comprising, in combination, a pressure vessel containing pressure fluid and provided with a normally closed outlet controlling flow of the pressure fluid to an occupant restraint cushion, a combustion chamber within the pressure vessel and including a normally open outlet to the pressure vessel, a gas generating charge of propellant within the combustion chamber, pressure sensor means overlying the combustion chamber outlet for sensing the pressure level in the pressure vessel, rupturable sealing means sealing the pressure sensor means to the combustion chamber to normally close the outlet to the pressure vessel, means connecting the sensor means through the chamber to an external indicator, means for initiating the charge of propellant to generate high pressure, high temperature gas and move the sensor means from the outlet as the rupturable sealing means ruptures to thereby open the outlet to the pressure vessel, and means operative upon rupture of the rupturable sealing means for opening the pressure vessel outlet to the cushion.

4. An inflator comprising, in combination, a pressure vessel containing pressure fluid and provided with a normally closed outlet controlling flow of the pressure fluid to an occupant restraint cushion, a combustion chamber within the pressure vessel and including a normally open outlet to the pressure vessel, a gas generating charge of propellant within the combustion chamber, pressure sensor means overlying the combustion chamber outlet for sensing the pressure level in the pressure vessel and including a wall engageable with the chamber around the outlet, rupturable sealing means sealing the pressure sensor means to the combustion chamber and locating the wall thereof in engagement with the chamber around the outlet to normally close the outlet to the pressure vessel, means for initiating the charge of propellant to generate high pressure, high temperature gas and move the sensor means wall from the outlet as the rupturable sealing means ruptures to thereby open the outlet to the pressure vessel, and means operative upon movement of the sensor means for opening the pressure vessel outlet to the cushion.

5. An inflator comprising, in combination, a pressure vessel containing pressure fluid and provided with a normally closed outlet controlling flow of the pressure fluid to an occupant restraint cushion, a combustion chamber within the pressure vessel and including a normally open outlet to the pressure vessel, a gas generating charge of propellant within the combustion chamber, pressure sensor means overlying the combustion chamber outlet for sensing the pressure level in the pressure vessel, a pressure deflectable annulus sealed to the chamber around the outlet, means sealing the pressure sensor means to the annulus to normally close the outlet, deflection of the annulus under the pressure of the pressure fluid seating the pressure sensor means to the chamber around the outlet to limit the deflection of the annulus, means for initiating the charge of propellant to generate high pressure, high temperature gas and move the pressure sensor means from the outlet as the annulus ruptures to thereby open the outlet to the pressure vessel, and means operative upon rupture of the annulus for opening the pressure vessel outlet to the cushion.

6. An inflator comprising, in combination, a pressure vessel containing pressure fluid and provided with a normally closed rupturable outlet controlling flow of the pressure fluid to an occupant restraint cushion, a combustion chamber within the pressure vessel and including an outlet open to the pressure vessel, a gas generating charge of propellant within the combustion chamber, pressure sensor means for sensing the pressure level in the pressure aperture, and including a substantially closed chamber having an inlet wall provided with an aperture therein, pressure responsive means within the chamber and being subjected to the pressure of the pressure fluid through the inlet wall aperture, rupturable sealing means sealing the pressure sensor means to the combustion chamber over the outlet thereof to normally close the outlet from the combustion chamber to the pressure vessel, an impact member for impacting and rupturing the pressure vessel outlet, means mounting the member to the inlet wall around the aperture therein, means for conducting pressure fluid from the pressure vessel to the aperture and means for initiating the charge of propellant to generate high pressure, high temperature gas and rupture the mounting means and move the pressure sensor means from the outlet as the sealing means ruptures to thereby open the outlet to the pressure vessel, the impact member impacting and rupturing the rupturable outlet upon movement of the pressure sensor means to open the pressure vessel outlet to the cushion.

7. An inflator comprising, in combination, a pressure vessel containing pressure fluid and provided with a normally closed outlet controlling flow of the pressure fluid to an occupant restraint cushion, a combustion chamber within the pressure vessel and including a normally open outlet to the pressure vessel, a gas generating charge of propellant within the combustion chamber, pressure sensor means for sensing the pressure level in the pressure vessel and including a chamber containing pressure fluid and having a base wall, rupturable means sealing the base wall of the pressure sensor means to the combustion chamber over the outlet thereof to close the outlet from the combustion chamber to the pressure vessel, means within the chamber responsive to the pressure differential between the chamber and the pressure vessel, means extending through the combustion chamber outlet and base wall for connecting the pressure responsive means through the chamber to an external indicator, means for initiating the charge of propellant to generate high pressure, high temperature gas and move the sensor means from the outlet as the rupturable means ruptures to thereby open the outlet from the combustion chamber to the pressure vessel, and means for opening the pressure vessel outlet to the cushion.

8. An inflator comprising, in combination, a pressure vessel containing pressure fluid and provided with a normally closed outlet controlling flow of the pressure fluid to an occupant restraint cushion, a combustion chamber within the pressure vessel and including a normally open outlet to the pressure vessel, a gas generating charge of propellant within the combustion chamber, pressure sensor means for sensing the pressure level in the pressure vessel and including a projecting switch contact, rupturable means sealing the pressure sensor means to the combustion chamber around the outlet to close the outlet from the combustion chamber and locate the projecting switch contact within the chamber through the chamber outlet, means within the chamber releasably connecting the switch contact to an external indicator, means for initiating the charge of propellant to generate high pressure, high temperature gas and move the sensor means from the outlet as the sealing means ruptures to open the outlet from the combustion chamber to the pressure vessel, and means for opening the pressure vessel outlet to the cushion.

9. An inflator comprising, in combination, a pressure vessel containing pressure fluid and provided with a normally closed outlet controlling flow of the pressure fluid to an occupant restraint cushion, a combustion chamber within the pressure vessel and including a normally open outlet to the pressure vessel, first contact means within the combustion chamber, means for connecting the first contact means through the combustion chamber to an external indicator, a gas generating charge of propellant within the combustion chamber, pressure sensor means overlying the outlet, rupturable means sealing the pressure sensor means to the chamber around the outlet to normally close the outlet, second contact means extending from the pressure sensor means through the outlet and releasably engageable with the first contact means to connect the pressure sensor means to the external indicator, means for initiating the charge of propellant to generate high pressure, high temperature gas and move the sensor means and second contact means from the outlet upon rupture of the rupturable sealing means to thereby open the outlet from the combustion chamber to the pressure vessel, and means for opening the pressure vessel outlet to the cushion.

* * * * *

UNITED STATES PATENT AND TRADEMARK OFFICE
CERTIFICATE OF CORRECTION

PATENT NO. : 3,869,143
DATED : March 4, 1975
INVENTOR(S) : Richard L. Merrell

It is certified that error appears in the above-identified patent and that said Letters Patent are hereby corrected as shown below:

Column 6, line 41, the word "aperture" should read "vessel".

Signed and Sealed this fifth Day of August 1975

[SEAL]

Attest:

RUTH C. MASON
*Attesting Officer*

C. MARSHALL DANN
*Commissioner of Patents and Trademarks*